United States Patent
Babu et al.

(10) Patent No.: US 10,382,374 B2
(45) Date of Patent: Aug. 13, 2019

(54) PRIVILEGED AND PROTECTED ANNOUNCEMENTS, BROADCASTS, OR POSTS

(71) Applicant: International Business Machines Corporation, Armonk, NY (US)

(72) Inventors: Venkatesh K S. Babu, Bangalore (IN); Saba Kauser, Bangalore (IN); Amarnath N. Reddy, Bangalore (IN); Gaurav Saxena, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/481,154

(22) Filed: Apr. 6, 2017

(65) Prior Publication Data

US 2018/0295083 A1 Oct. 11, 2018

(51) Int. Cl.
*H04L 12/58* (2006.01)
*G06F 3/0481* (2013.01)
*G06F 21/44* (2013.01)

(52) U.S. Cl.
CPC .............. *H04L 51/12* (2013.01); *H04L 51/32* (2013.01); *G06F 21/44* (2013.01)

(58) Field of Classification Search
USPC .......................... 709/206, 200, 201, 204, 219
See application file for complete search history.

(56) References Cited

U.S. PATENT DOCUMENTS

| | | | |
|---|---|---|---|
| 8,706,702 B2* | 4/2014 | Marquez | G06Q 10/10 707/690 |
| 8,856,223 B2 | 10/2014 | Cohen et al. | |
| 9,071,932 B2 | 6/2015 | Sayed | |
| 9,179,274 B2 | 11/2015 | Lisbey et al. | |
| 9,338,493 B2* | 5/2016 | Van Os | G06F 16/73 |
| 9,405,821 B1* | 8/2016 | Bessis | G06F 17/30654 |
| 2003/0020948 A1* | 1/2003 | Jarvis | H04L 41/046 358/1.15 |
| 2003/0220936 A1* | 11/2003 | Gifford | G06F 17/30569 |
| 2009/0037446 A1* | 2/2009 | Toney | G06Q 20/201 |
| 2011/0087712 A1* | 4/2011 | Marquez | G06F 17/5018 707/812 |

(Continued)

*Primary Examiner* — Jude Jean Gilles
(74) *Attorney, Agent, or Firm* — North Shore Patents, P.C.; Michele Liu Baillie

(57) ABSTRACT

A system protects content, by detecting, by a first application interface, a message attribute associated with content received by the first application interface. A syntax parser on a first application parses the content to identify the message attribute. The first application interface embeds a protect attribute in metadata associated with the content, where the protect attribute indicated by the message attribute. The system transmits the content from the first application interface to a second application interface. The second application interface extracts the protect attribute from the metadata associated with the content. The system applies the protect attribute to the content rendered by the second application interface. The system propagates the protect attribute applied to the content when the content is transmitted from the second application interface to at least one third application interface, and then applies the protect attribute to the content rendered by the third application interface.

20 Claims, 7 Drawing Sheets

(56) References Cited

U.S. PATENT DOCUMENTS

| | | | |
|---|---|---|---|
| 2011/0154461 A1* | 6/2011 | Anderson | H04L 63/0227 |
| | | | 726/7 |
| 2012/0023395 A1* | 1/2012 | Pieczul | G06F 21/51 |
| | | | 715/234 |
| 2014/0215367 A1* | 7/2014 | Kim | G06Q 10/10 |
| | | | 715/765 |
| 2014/0317198 A1 | 10/2014 | Bendi et al. | |
| 2016/0117521 A1* | 4/2016 | Spalka | G06F 21/6227 |
| | | | 713/171 |
| 2016/0248637 A1* | 8/2016 | Baldassari | G06F 3/04842 |
| 2016/0350084 A1* | 12/2016 | Waggoner | G06F 8/34 |

* cited by examiner

PRIVILEGED AND PROTECTED ANNOUNCEMENTS, BROADCASTS, OR POSTS

BACKGROUND

Posting on social media generally results in others responding to those postings. There are situations where a poster wishes to pass information along, but does not care to receive responses, or to generate a debate among those who respond to the original post. Additionally, there are situations where a poster wishes to post on social media, but restrict who may be able to see those postings. Therefore, it would be helpful to mark a social medial posting as protected or privileged to achieve these objectives.

SUMMARY

According to an embodiment of the present invention, in a method for protecting content, a first application interface detects a message attribute associated with content received by the first application interface. A syntax parser on a first application parses the content to identify the message attribute. The first application interface embeds a protect attribute in metadata associated with the content, where the protect attribute is indicated by the message attribute. The method transmits the content from the first application interface to a second application interface. The second application interface extracts the protect attribute from the metadata associated with the content. The method applies the protect attribute to the content rendered by the second application interface. The method then modifies at least one element presented by the second application interface to indicate to a user that the protect attribute has been applied to the content.

In an example embodiment, when the method modifies at least one element presented by the second application interface, the second application interface instructs a graphical user interface associated with the second application interface to render at least one element modified according to the protect attribute.

In an example embodiment, the method propagates the protect attribute applied to the content when the content is transmitted from the second application interface to at least one third application interface. The method applies the protect attribute to the content rendered by at least one third application interface.

In an example embodiment, in response to applying the protect attribute to the content rendered by the second application interface, the method prevents the content from being transmitted from the second application interface to a third application interface.

In an example embodiment, when the first application interface detects the message attribute associated with content received by the first application interface, the method receives the message attribute from a user interacting with the first application interface on a first device, where the message attribute is applied to the content provided by the user. The method presents on a graphical user interface associated with the first application interface, an indication to the user, that the protect attribute has been associated with the content.

In an example embodiment, when the syntax parser on the first application parses the content to identify the message attribute, the method detects that the message attribute is applied to at least a portion of the content. When the method applies the protect attribute to the content rendered by the second application interface, the method applies the protect attribute to at least a portion of the content rendered by the second application interface.

In an example embodiment, when the syntax parser on the first application parses the content to identify the message attribute, the method detects that the message attribute identifies at least one recipient of the content. When the method applies the protect attribute to the content rendered by the second application interface, the method applies the protect attribute to the content rendered by the second application interface where the protect attribute allows at least one recipient access to the content.

System and computer program products corresponding to the above-summarized methods are also described and claimed herein.

DETAILED DESCRIPTION

Figure 1:
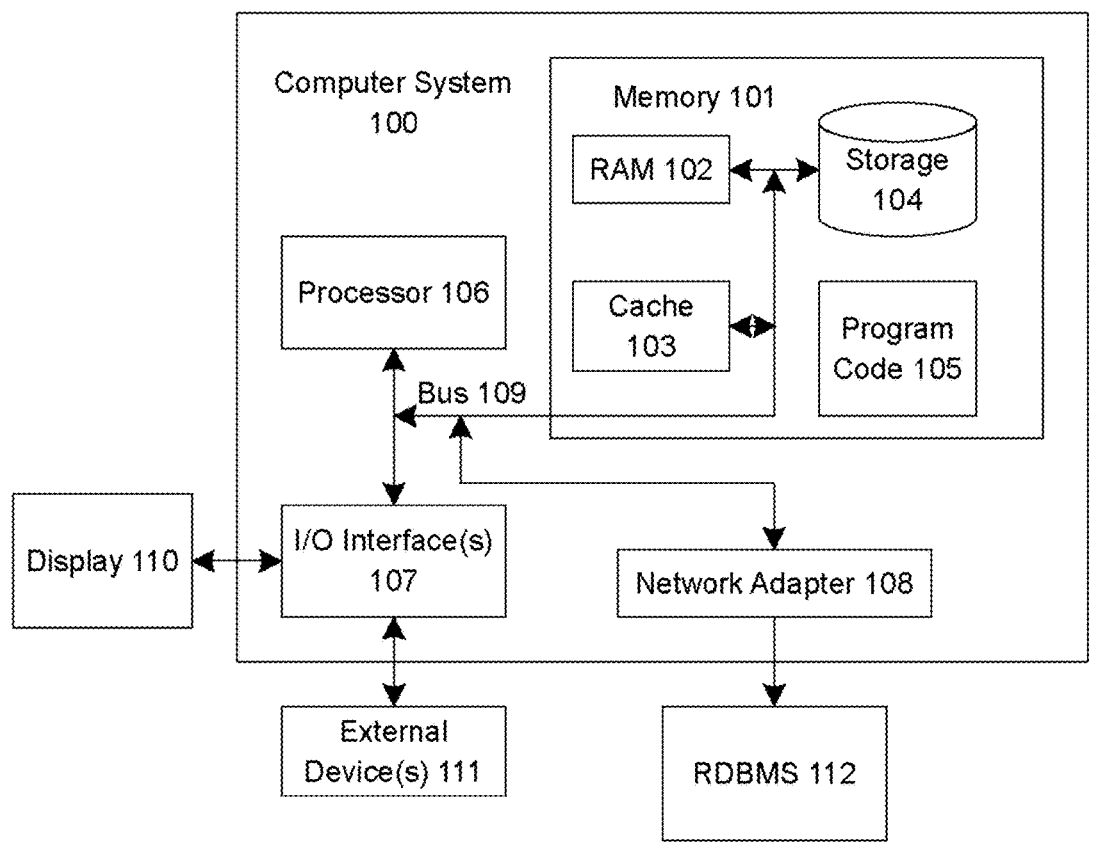
FIG. 1 illustrates an embodiment of a system for protecting content, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for protecting content according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiments of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
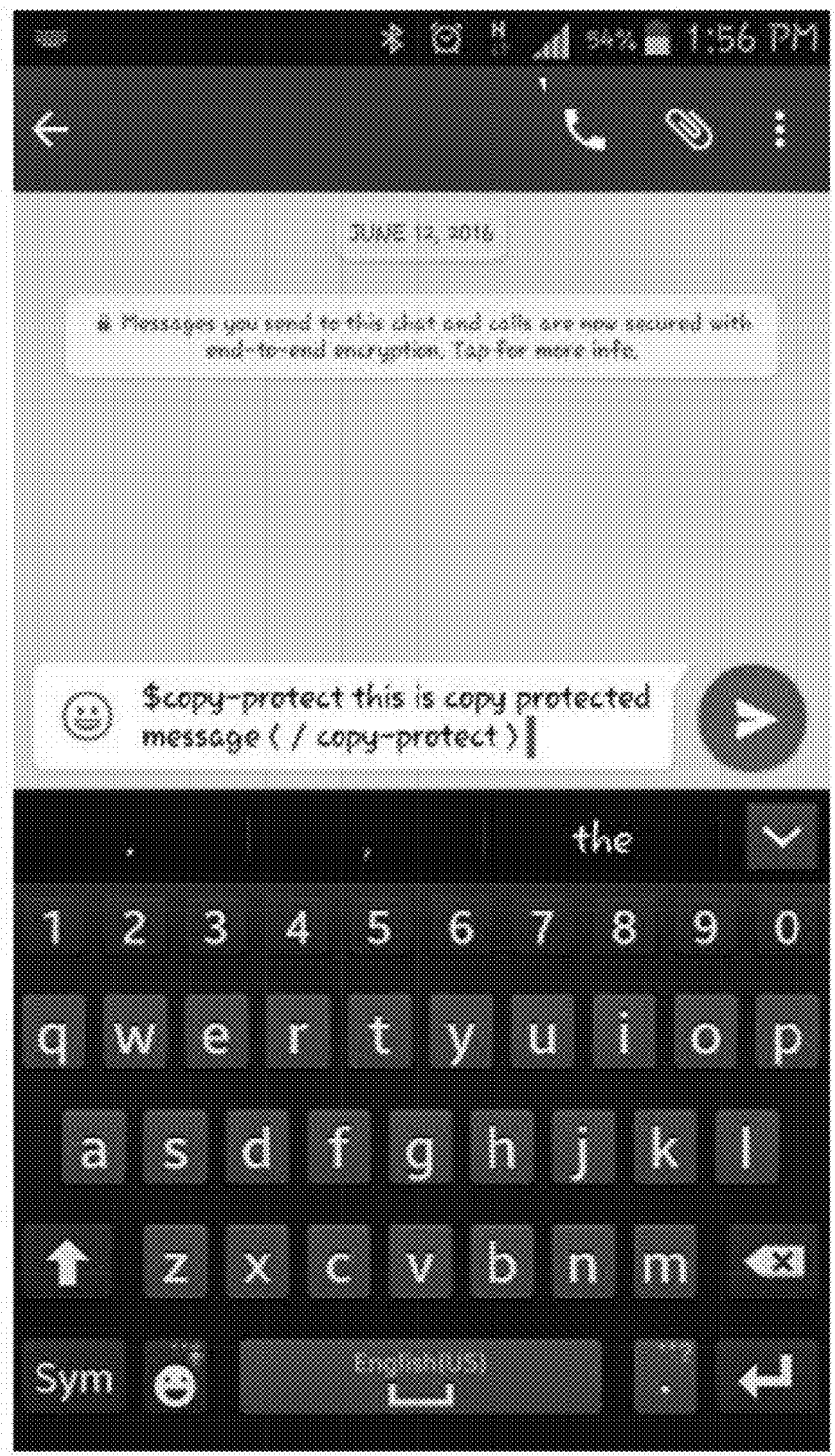
FIG. 2 illustrates an example screenshot of a copy-protect attribute of a message, according to embodiments disclosed herein.

FIG. 2 illustrates an example screenshot of a copy-protect attribute associated with a message, as viewed from a sending device. A protect attribute may be a symbol, one or more characters, or any other type of indication that a protect attribute is associate with the content.

Figure 3:
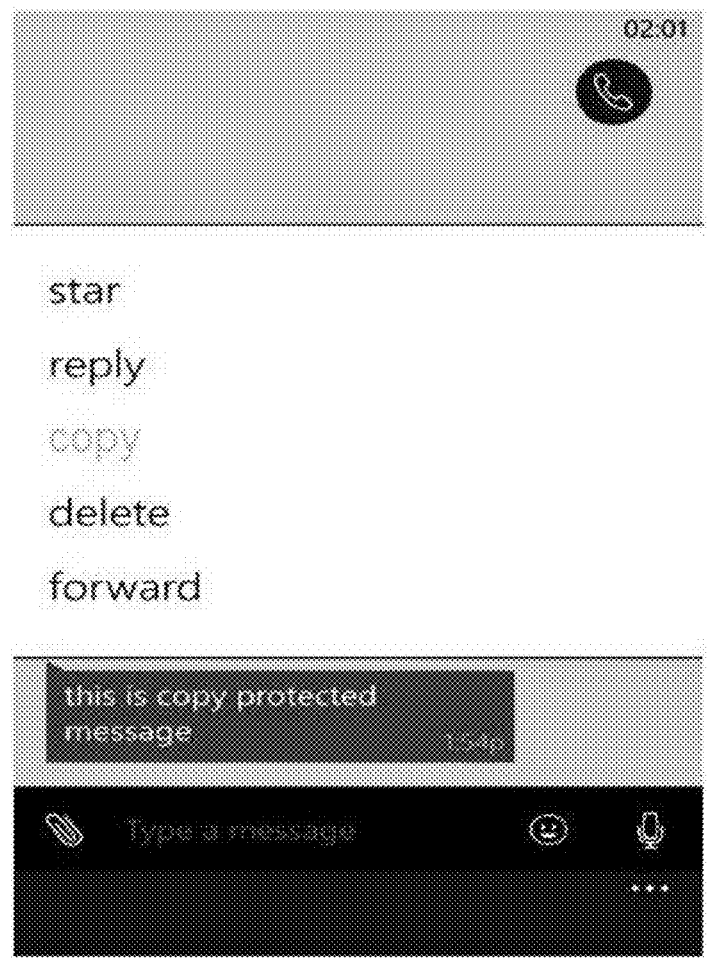
FIG. 3 illustrates an example screenshot of a receiving device where the copy button is disabled, according to embodiments disclosed herein.

FIG. 3 illustrates an example screenshot of a receiving device where the "copy" option is greyed out to indicate that this option is disabled for the user for the currently displayed message/content. In this example scenario, the copy protected message from the sending device illustrated in FIG. 2 appears in the receiving device as illustrated in FIG. 3. In an example embodiment, the user interface of the receiving device may determine how the protect attribute is presented to the receiving user. For example, in FIG. 3, the "copy" option is greyed out to indicate that option is disabled. Another user interface might present the "copy" option as a button, and the user interface of the receiving device may determine how to represent that "copy" button to indicate to the user that the "copy" button is disabled/unavailable for the current message/content.

Figure 4:
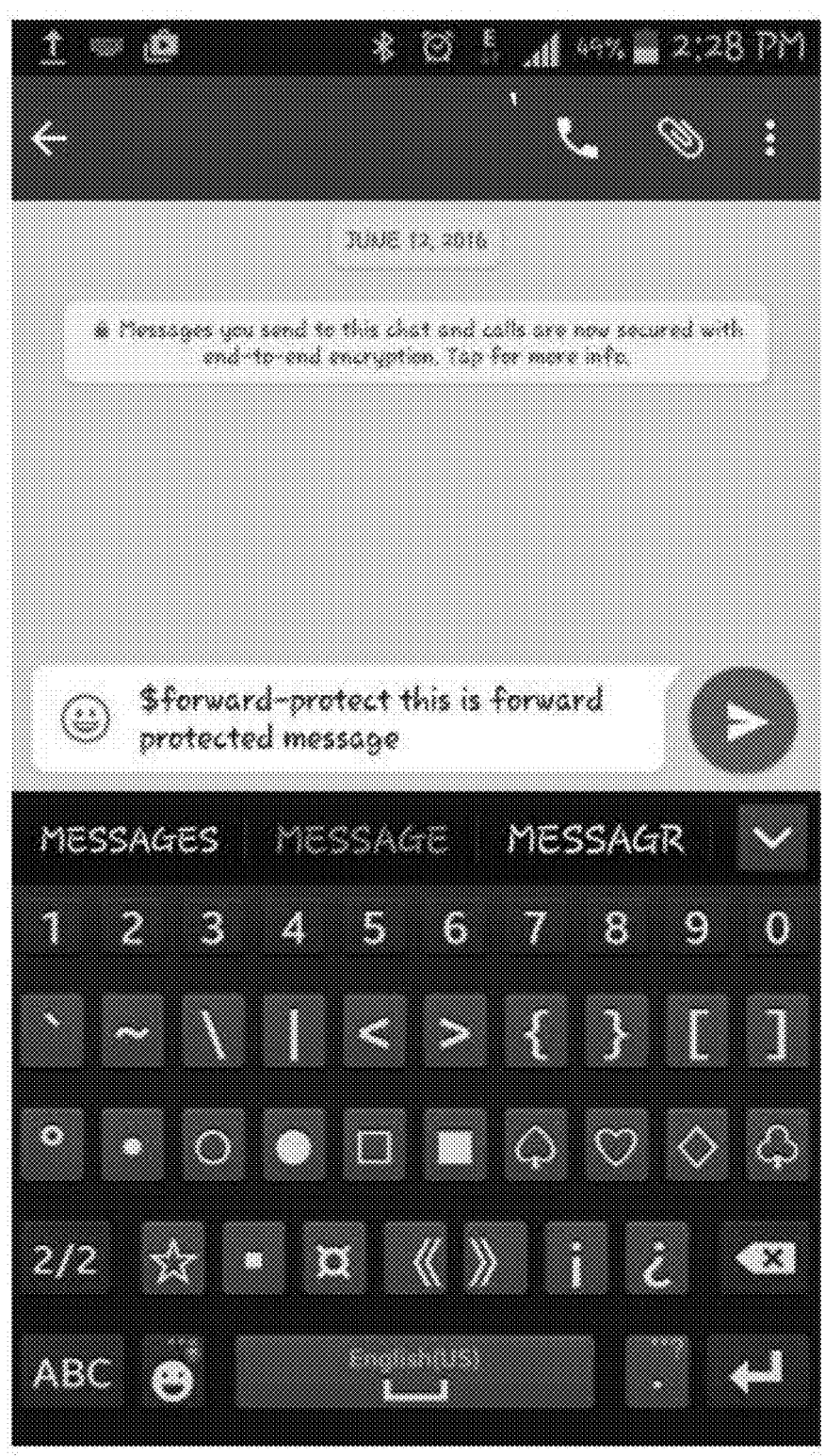
FIG. 4 illustrates an example screenshot of a forward-protect attribute of a message, according to embodiments disclosed herein.
Figure 5:
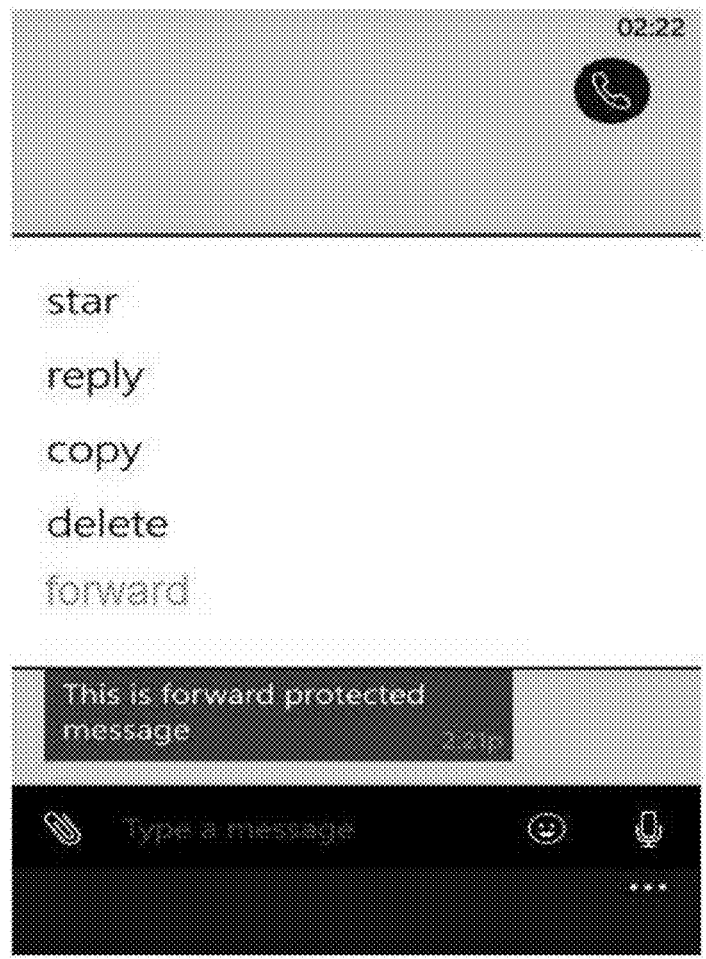
FIG. 5 illustrates an example screenshot of a receiving device where the forward button is disabled, according to embodiments disclosed herein.

FIG. 4 illustrates an example screenshot of a forward-protect attribute of a message, as viewed from a sending device. FIG. 5 illustrates an example screenshot of a receiving device where the forward option is greyed out to indicate this option is disabled for the user for currently displayed message/content. In this example scenario, the forward protected message from the sending device illustrated in FIG. 4 appears at the receiving device as illustrated in FIG. 5.

Embodiments disclosed herein provide a user with control over content, such as message sharing/posting, even when content posting applications do not provide such control. More specifically, the user may add, for example, symbols to content (or portions of content) to protect the content (or the portions of the content) and/or to mark the content as privileged (i.e., only identified recipients may access the content). For example, the user may protect the content using syntax such as "<symbol><pre-defined tag><content><end-tag>". The end-tag may be optional, for example. The entire content or portions of the content may be write protected (such as if another user were to forward the message), for example, using syntax such as "$write-protect <message-body></write-protect>". The user may specify that the entire content or portions of the content can not be copied (or used) by using syntax such as "$copy-protect <message-body></copy-protect>". The user may specify that other users may not forward the content by using syntax such as "$forward-protect <message-body>". The user may mark the content as "reply protected" where the user controls who can reply to the content that the user posted. The user may reply protect the content by using syntax such as "$reply-protect <message body>". No users receiving this content will be able to respond to the sender of the message and/or conversation thread.

In an example embodiment, in a group chat/discussion, a user may specify those members who can view the content by specifying a particular person, multiple persons, and/or members of a group using syntax such as ":<person/group><message>. In this example scenario, even though the content is posted in a group chat/discussion, only those people specified in the "<person/group>" section of the message attribute will be privileged to view the content. This allows the user to share information while ensuring that privileged information remains private, yet still remaining in the group chat/discussion (as opposed to having to open a separate chat to discuss private information). In an example embodiment, different symbols may be used to indicate protection versus privilege. For example, the symbol "$" may be designated to signify protection, while the symbol ":" may be designated to signify privilege.

Figure 6:
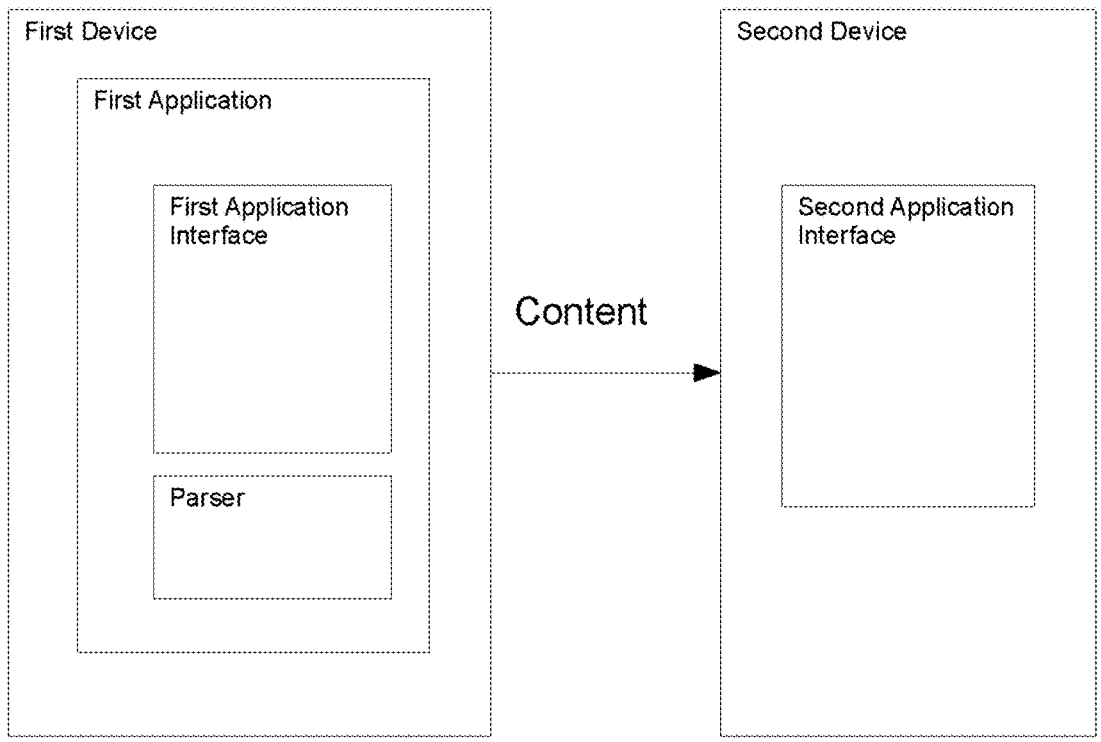
FIG. 6 illustrates an example high level system of two devices, according to embodiments disclosed herein.
Figure 7:
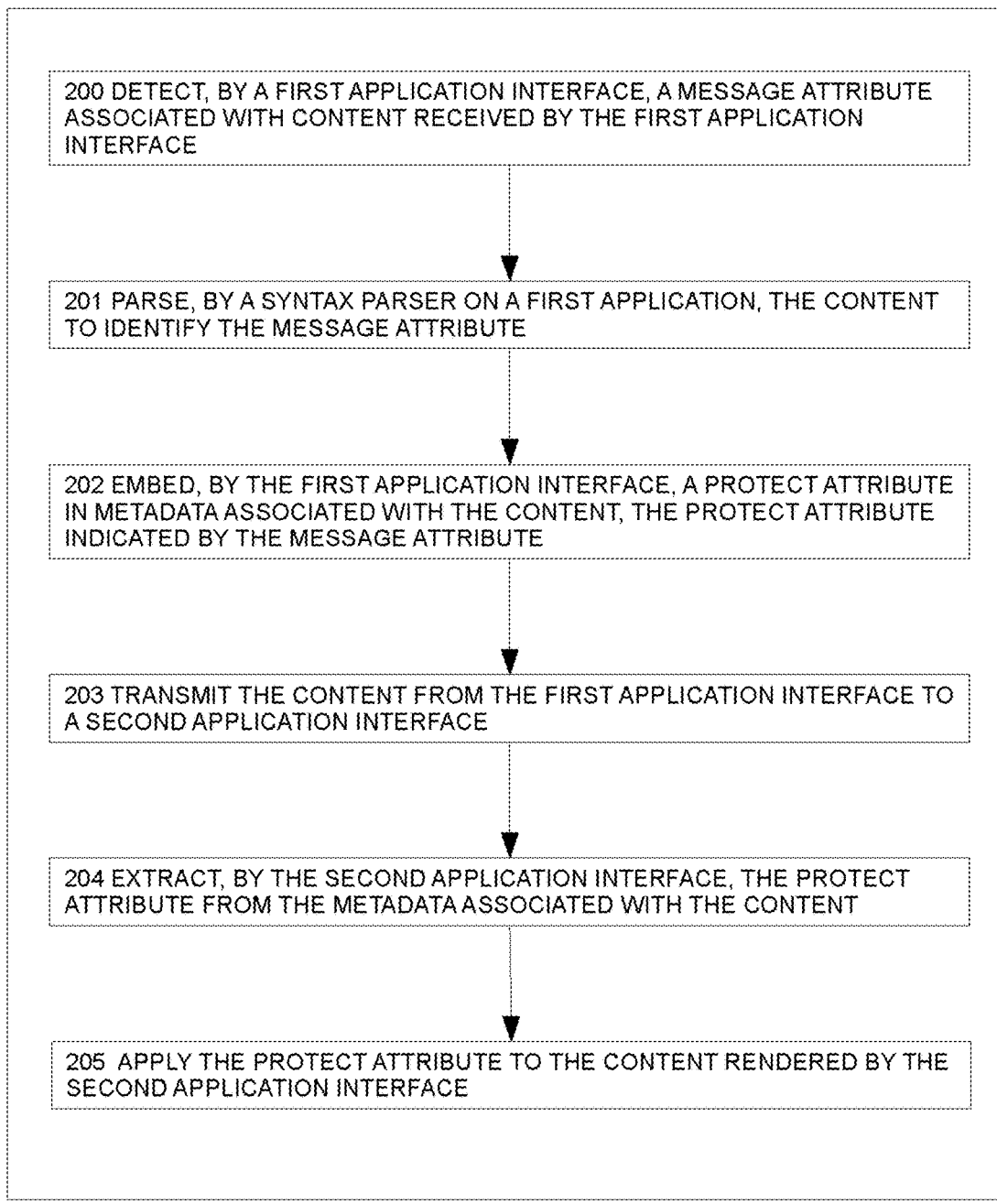
FIG. 7 is a flowchart illustrating an embodiment of a method for protecting content, according to embodiments disclosed herein.

FIG. 6 illustrates an example high level system of two devices, and FIG. 7 illustrates an embodiment of a method for protecting content. At 200, a first application interface detects a message attribute associated with content received by the first application interface. The content may be, for example, an email message, social media posting (i.e., posts, announcements, tweets, broadcasts, etc.), text message, etc. The user chooses which portions of the content to apply the message attribute, and which message attribute (i.e., write protect, copy protect, forward protect, reply protect, etc.) to associate with the content. The user associates the message attribute with the content prior to sending/transmitting/posting the content. A first device, such as a mobile device, comprises a first application, such as a social media application. The first application comprises a first application interface. For example, the social media application has an interface where a user enters social media posts. In an example embodiment, a user enters a social media post (i.e., content), and associates a message attribute with that social media post, such as a copy protect message attribute as illustrated in FIG. 2. The first application interface detects the copy protect message attribute associated with the social media post. For example, a user may want to post information on social media for informational purposes only, and does not wish that other users/viewers start debating the issue. Or, the user may want to send and/or post content, but may not want other users to copy and/or forward that posted content.

At 201, a syntax parser on the first application parses the content to identify the message attribute. As illustrated in FIG. 2, the message attribute may be, for example, a copy protect message attribute. A syntax parser on the first application parses the social media post (i.e., content) to identify the message attribute. In an example embodiment, when the user enters the social media post in the user interface of the social media application, the user associates the copy protect message attribute with the content. The copy protect message attribute prevents other social media users from being able to copy the contents of the message. Thus, a user may post social media content, for example, that the user wishes to post for information purposes only, and prevent any other social media users from being able to copy that social media content.

At 202, the first application interface embeds a protect attribute in metadata associated with the content, where the protect attribute is indicated by the message attribute. In an example embodiment, the copy protect attribute is embedded as a token in the content metadata that is send from the first device to, for example, a second device. The first device may be a device where a user initiates a posting to a social media application. The second device may be, for example, a device which posts the social media posting (for example, on a website) for other users to view on their own devices. The first device may be a device where a first user initiates a message to be sent to a second user. The second device, may be, for example, the device on which the second user receives the message sent from the first user (such as when the first user messages, or invokes a chat session with the second user).

At 203, the method transmits the content from the first application interface to a second application interface. As noted above, a user may initiate content from a first device. The first application interface on the first device transmits the content to a second application interface on a second device. The content may be transmitted using the protocol that the two devices use to communicate.

At 204, the second application interface extracts the protect attribute from the metadata associated with the content, and at 205, the method applies the protect attribute to the content rendered by the second application interface. In an example embodiment, the second application interface, located on a second device, intercepts the content metadata to identify any protect attributes. The content may have one or more protect attributes associated with the content. The second application interface has a metadata extractor that extracts the protect attribute from the metadata associated with the content, and indicates to the second application interface how the content is to be protected when rendered on the second application interface.

In an example embodiment, the method modifies at least one element presented by the second application interface to indicate to a user that the protect attribute has been applied to the content. As illustrated in FIG. 3, the "copy" option is disabled within the second application interface on the second device.

In an example embodiment, when the method modifies at least one element presented by the second application interface, the second application interface instructs a graphical user interface associated with the second application interface to render at least one element modified according to the protect attribute. As noted above, the user interface of the receiving device may determine how the protect attribute is presented to the receiving user.

In an example embodiment, the method propagates the protect attribute applied to the content when the content is transmitted from the second application interface to at least one third application interface, and applies the protect attribute to the content rendered by the third application interface. In other words, when a user on a first device applies a protect attribute to content, and that content is transmitted from the first device to the second device, the protect attribute is propagated along with the content when the content is transmitted from the second device to a third device (or fourth, or fifth, etc.). Thus, if a user wishes to tag a social media posting as, for example, copy protected (meaning other users cannot copy the content), and that user transmits the content from the first device to a second device, the second user (of the second device) will not be able to copy the content. If that second user transmits the content from the second device to a third device, the third user of the third device will also not be able to copy the content.

In an example embodiment, in response to applying the protect attribute to the content rendered by the second application interface, the method prevents the content from being transmitted from the second application interface to a third application interface. For example, if a user operating the first device tags the content as "forward protected", and transmits that content to a second device, the method prevents the content from being forwarded from the second device to a third (or any) device.

In an example embodiment, when the first application interface detects the message attribute associated with content, the method receives the message attribute from a user interacting with the first application interface on a first device, where the message attribute is applied to the content provided by the user. The method then presents on a graphical user interface associated with the first application interface, an indication to the user, that the protect attribute has been associated with the content. For example, as illustrated in FIG. 4, when the user applies syntax to the content to indicate that the content is forward protected, the method provides notification to the user that the user's message (i.e., content) is forward protected.

In an example embodiment, when the syntax parser on the first application parses the content to identify the message attribute, the syntax parses detects that the message attribute is applied to at least a portion of the content. In other words, the user may apply the message attribute to some or all of the content. In this scenario, when the method applies, for example, the protect attribute to the content rendered by the second application interface, the method applies the protect attribute only to the portion of the content identified by the user (as protected), and is rendered by the second application interface. For example, a user may want to "write protect" a posting, so that users and/or groups of users who receive the posting will not be able to edit the write protected portions of the posting. The user may write protect the posting by associating the message attribute with the posting using the syntax "$<write-protect> There is a seminar in xxx at 10.30 AM on 1 Jan. 2017. </write-protect> Let's catch up". Those users who receive this posting will not be able to edit the portion of the posting within the "<write-protect>" and "</write-protect>" tags. The receiving users, however, will be able to edit the "Let's catch up" portion of the posting since that portion is not encapsulated between "<write-protect>" and "</write-protect>" tags. The receiving users may also add new tags to the message, for example, to copy protect the posting using the syntax "$<copy-protect> There is a seminar in xxx at 10.30 AM on 1 Jan. 2016. Let's catch up and discuss more about our new start-up!</copy-protect>".

In an example embodiment, when the syntax parser on the first application parses the content to identify the message attribute, the syntax parser detects that the message attribute identifies at least one recipient of the content. In this scenario, when the method applies the protect attribute to the content rendered by the second application interface, the method applies the protect attribute to the content rendered by the second application interface where the protect attribute allows at least one recipient access to the content. In other words, a user may identify content as being privileged and identify the recipient (or recipients) who may access the content. Those recipients may be named individually, or identified by a group name that the recipients belong to.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of protecting content, the method comprising:

detecting, by a first application interface, a message attribute associated with content received by the first application interface;
  parsing, by a syntax parser on a first application, the content to identify the message attribute;
  embedding, by the first application interface, a protect attribute in metadata associated with the content, the protect attribute indicated by the message attribute;
  transmitting the content from the first application interface to a second application interface;
  extracting, by the second application interface, the protect attribute from the metadata associated with the content; and
  applying the protect attribute to the content rendered by the second application interface.

2. The method of claim 1 further comprising:
modifying at least one element presented by the second application interface to indicate to a user that the protect attribute has been applied to the content.

3. The method of claim 2 wherein modifying the at least one element presented by the second application interface comprises:
instructing, by the second application interface, a graphical user interface associated with the second application interface to render the at least one element modified according to the protect attribute.

4. The method of claim 1 further comprising:
propagating the protect attribute applied to the content when the content is transmitted from the second application interface to at least one third application interface; and
applying the protect attribute to the content rendered by the at least one third application interface.

5. The method of claim 1 further comprising:
in response to applying the protect attribute to the content rendered by the second application interface, preventing the content from being transmitted from the second application interface to a third application interface.

6. The method of claim 1 wherein detecting, by the first application interface, the message attribute associated with content received by the first application interface comprises:
receiving the message attribute from a user interacting with the first application interface on a first device, the message attribute applied to the content provided by the user; and
presenting, on a graphical user interface associated with the first application interface, an indication to the user, that the protect attribute has been associated with the content.

7. The method of claim 1 wherein parsing, by the syntax parser on the first application, the content to identify the message attribute comprises:
detecting the message attribute is applied to at least a portion of the content; and
wherein applying the protect attribute to the content rendered by the second application interface comprises:
applying the protect attribute to the at least a portion of the content rendered by the second application interface.

8. The method of claim 1 wherein parsing, by the syntax parser on the first application, the content to identify the message attribute comprises:
detecting the message attribute identifies at least one recipient of the content; and
wherein applying the protect attribute to the content rendered by the second application interface comprises:
applying the protect attribute to the content rendered by the second application interface wherein the protect attribute allows the at least one recipient access to the content.

9. A computer program product for protecting content, the computer program product comprising:
a non-transitory computer readable storage medium having computer readable program code embodied therewith, the program code executable by a computer processor to:
detect, by a first application interface, a message attribute associated with content received by the first application interface;
parse, by a syntax parser on a first application, the content to identify the message attribute; embed, by the first application interface, a protect attribute in metadata associated with the content, the protect attribute indicated by the message attribute;
transmit the content from the first application interface to a second application interface; extracting, by the second application interface, the protect attribute from the metadata associated with the content; and
apply the protect attribute to the content rendered by the second application interface.

10. The computer program product of claim 9 further configured to:
modify at least one element presented by the second application interface to indicate to a user that the protect attribute has been applied to the content.

11. The computer program product of claim 10 wherein the computer readable program code configured to modify the at least one element presented by the second application interface is further configured to:
instruct, by the second application interface, a graphical user interface associated with the second application interface to render the at least one element modified according to the protect attribute.

12. The computer program product of claim 9 further configured to:
propagate the protect attribute applied to the content when the content is transmitted from the second application interface to at least one third application interface; and
apply the protect attribute to the content rendered by the at least one third application interface.

13. The computer program product of claim 9 further configured to:
in response to applying the protect attribute to the content rendered by the second application interface, prevent the content from being transmitted from the second application interface to a third application interface.

14. The computer program product of claim 9 wherein the computer readable program code configured to parse, by the syntax parser on the first application, the content to identify the message attribute is further configured to:
detect the message attribute is applied to at least a portion of the content; and
wherein the computer readable program code configured to apply the protect attribute to the content rendered by the second application interface is further configured to:
apply the protect attribute to the at least a portion of the content rendered by the second application interface.

15. The computer program product of claim 9 wherein the computer readable program code configured to parse, by the syntax parser on the first application, the content to identify the message attribute is further configured to:
detect the message attribute identifies at least one recipient of the content; and
wherein the computer readable program code configured to apply the protect attribute to the content rendered by the second application interface is further configured to:
apply the protect attribute to the content rendered by the second application interface wherein the protect attribute allows the at least one recipient access to the content.

16. A system comprising:
a computing processor; and
a computer readable storage medium operationally coupled to the processor, the computer readable storage medium having computer readable program code embodied therewith to be executed by the computing processor, the computer readable program code configured to:

detect, by a first application interface, a message attribute associated with content received by the first application interface;

parse, by a syntax parser on a first application, the content to identify the message attribute; embed, by the first application interface, a protect attribute in metadata associated with the content, the protect attribute indicated by the message attribute;

transmit the content from the first application interface to a second application interface; extract, by the second application interface, the protect attribute from the metadata associated with the content; and apply the protect attribute to the content rendered by the second application interface.

17. The system of claim 16 further configured to:

modify at least one element presented by the second application interface to indicate to a user that the protect attribute has been applied to the content.

18. The system of claim 16 further configured to:

propagate the protect attribute applied to the content when the content is transmitted from the second application interface to at least one third application interface; and apply the protect attribute to the content rendered by the at least one third application interface.

19. The system of claim 16 further configured to:

in response to applying the protect attribute to the content rendered by the second application interface, prevent the content from being transmitted from the second application interface to a third application interface.

20. The system of claim 16 wherein the computer readable program code configured to parse, by the syntax parser on the first application, the content to identify the message attribute is further configured to:

detect the message attribute identifies at least one recipient of the content; and wherein the computer readable program code configured to apply the protect attribute to the content rendered by the second application interface is further configured to:

apply the protect attribute to the content rendered by the second application interface wherein the protect attribute allows the at least one recipient access to the content.

* * * * *